United States Patent [19]

Hess

[11] Patent Number: 5,026,107

[45] Date of Patent: Jun. 25, 1991

[54] VEHICLE SPARE TIRE STORAGE APPARATUS

[76] Inventor: Kenneth J. Hess, Rte. 2, Box 38, Muenster, Tex. 76252

[21] Appl. No.: 418,486

[22] Filed: Oct. 10, 1989

[51] Int. Cl.$^5$ .............................................. B62D 43/04
[52] U.S. Cl. .................. 296/37.2; 296/37.3; 224/42.2; 224/42.12; 224/42.23
[58] Field of Search ............................ 296/37.2, 37.3; 224/42.12, 42.23, 42.41, 42.2

[56] References Cited

U.S. PATENT DOCUMENTS

| | | | |
|---|---|---|---|
| 1,761,916 | 6/1930 | Hebner | 224/42.23 X |
| 1,761,920 | 6/1930 | Hunt et al. | 224/42.23 |
| 2,034,834 | 3/1936 | Robinson, Jr. | 296/37.2 X |
| 4,106,681 | 8/1978 | Bott | 296/37.2 X |
| 4,221,312 | 9/1980 | Wertjes | 224/42.23 X |
| 4,428,513 | 1/1984 | Delmastro | 224/42.23 X |
| 4,676,415 | 6/1987 | Kennedy | 224/42.23 X |

FOREIGN PATENT DOCUMENTS

| | | | |
|---|---|---|---|
| 669632 | 9/1963 | Canada | 296/37.2 |
| 968319 | 5/1975 | Canada | 224/42.23 |
| 56831 | 7/1936 | Norway | 296/37.2 |
| 867557 | 5/1961 | United Kingdom | 296/37.2 |

Primary Examiner—Margaret A. Focarino
Assistant Examiner—Andrew C. Pike
Attorney, Agent, or Firm—W. Kirk McCord

[57] ABSTRACT

Apparatus for storing a spare tire or the like beneath a vehicle, such as beneath the bed of a pick-up truck, includes first and second spaced-apart support bars and first and second pairs of suspension arms depending from a bottom part of the vehicle. The first and second support bars extend between the respective first and second pairs of suspension arms and are mounted to respective laterally extending portions of the first and second pairs of suspension arms. The first support bar is detachably coupled to one of the first pair of suspension arms, so that when the first support bar is detached therefrom, the first support bar is rotatable with respect to the other one of the first pair of suspension arms, thereby facilitating removal of the spare tire from beneath the vehicle. The bottom part of the vehicle has an opening above the support bars for allowing access to the spare tire from above the vehicle. A cover member is hingedly connected to the bottom part of the vehicle for closing off the opening.

7 Claims, 3 Drawing Sheets

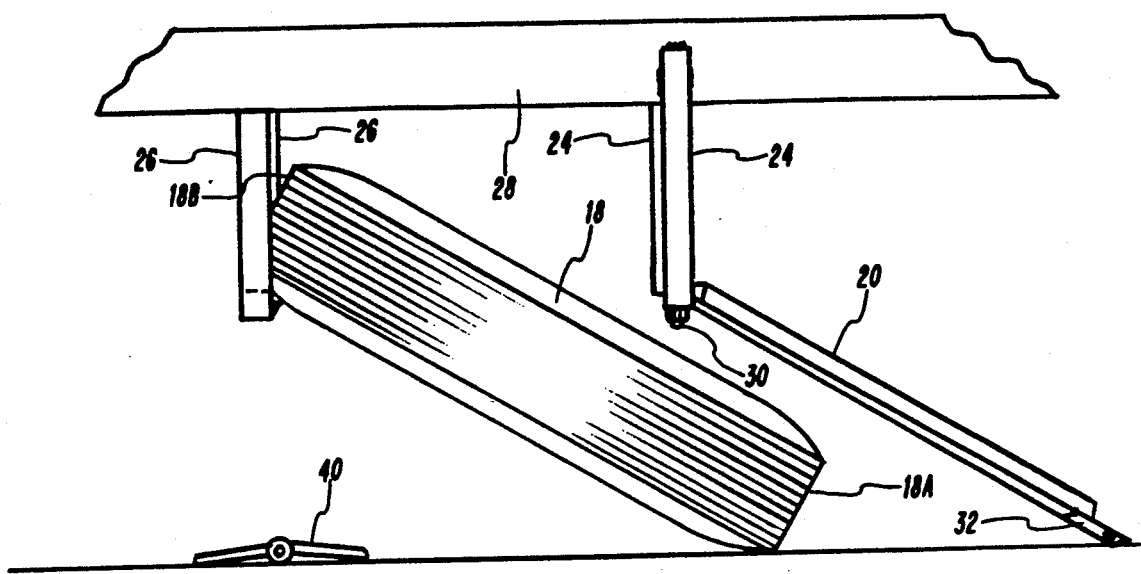
FIG. 4
FIG. 5
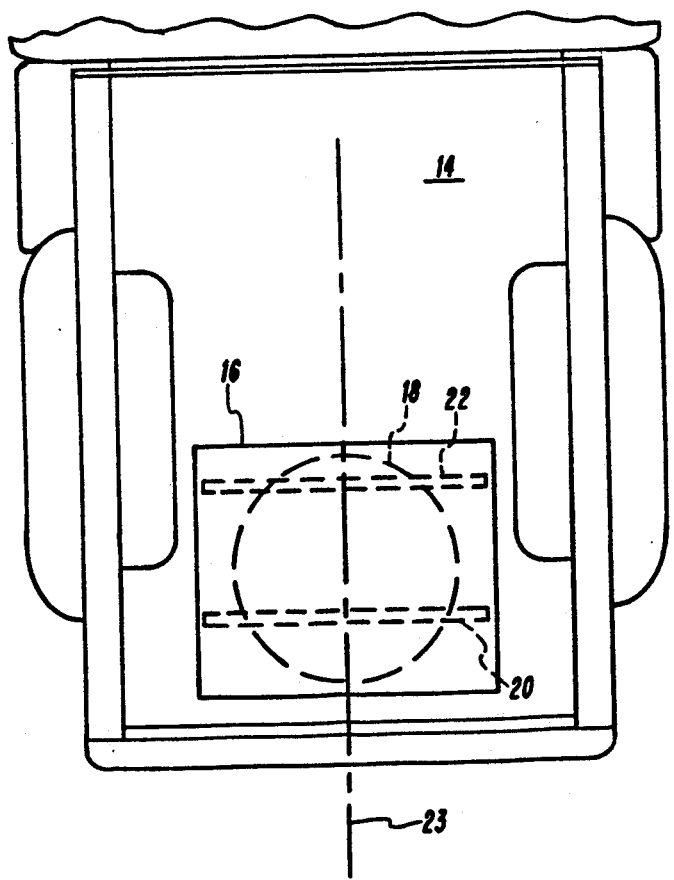

VEHICLE SPARE TIRE STORAGE APPARATUS

FIELD OF THE INVENTION

This invention relates to spare tire storage apparatus and in particular to apparatus for storing a spare tire beneath the bed of a pick-up truck or other vehicle.

BACKGROUND OF THE INVENTION

Motor vehicles, such as passenger cars and pick-up trucks, are typically equipped with recessed storage areas for spare tires and the like. The storage areas are usually situated so as not to interfere with a main storage area, such as the trunk of a passenger vehicle or the bed of a pick-up truck.

DESCRIPTION OF THE PRIOR ART

Numerous prior art patents have been issued on vehicle storage apparatus. U.S. Pat. No. 3,210,117 teaches a spare tire mount for a towing vehicle in which the tire is supported beneath the bed of a truck or other towing vehicle by a support frame, which is attached to a towing plate at the rear of the truck. The support frame and the tire can be slid past the back end of the truck to allow the tire to be removed.

U.S. Pat. No. 4,418,852 teaches a spare tire carrier, which is attachable to the undersurface of a truck or trailer, which does not have an interior spare tire storage capability. The carrier includes transversely extending rollers located beneath the surface of the tire to facilitate the sliding movement of the tire over the rollers.

U.S. Pat. No. 4,733,898 teaches a pick-up truck in which the open area between the auxiliary bed liner and the truck bed is partitioned into a plurality of storage compartments, including slidable drawers and tool bins.

U.S. Pat. No. 4,749,226 teaches a box-like storage apparatus for pick-up trucks formed by two hinged rectangular panels.

U.S. Pat. Nos. 4,398,765; 4,423,900; and 4,687,124 show various types of spare tire storage apparatus for passenger vehicles.

One problem associated with prior art storage apparatus, particularly those which are used to house spare tires and the like, is that it is difficult and inconvenient to remove items from their stored positions. For example, in a typical recessed storage compartment, the spare tire or other item must be lifted in order to remove it from storage. Removal is also inconvenient when the storage area is closed off and other items are stored above the storage area. For example, if the storage area is located beneath the bed of a truck, items stored in the truck bed must typically be removed before the storage area can be accessed.

In other types of storage areas where access to the contents thereof is available only from below the vehicle, one must typically crawl underneath the vehicle to remove the contents and to replace the contents after use. It is particularly difficult to replace a heavy object, such as a spare tire, by lifting it upwardly from beneath the vehicle.

SUMMARY OF THE INVENTION

In accordance with the present invention, a vehicle spare tire storage apparatus includes support means disposed beneath the vehicle and attached thereto for supporting the spare tire. The support means cooperates with a bottom part of the vehicle to provide a semi-enclosed housing for the spare tire. The bottom part of the vehicle has an opening above the support means for allowing access to the spare tire from above the vehicle. A cover member is provided for closing off the opening. The cover member is selectively movable away from the opening to prevent access to the spare tire through the opening.

In accordance with one aspect of the invention, the support means includes first and second spaced-apart support bars and first and second pairs of suspension arms attached to the bottom part of the vehicle and depending therefrom. Respective distal portions of the first and second pairs of suspension arms extend laterally with respect to a fore and aft axis of the vehicle. The first support bar extends between the first pair of suspension arms and is coupled to the respective extension portions of the first pair of suspension arms. The second support bar extends between the second pair of suspension arms and is coupled to the respective extension portions of the second pair of suspension arms. The first support bar is detachably coupled to at least one of the first pair of suspension arms, such that when the first support bar is detached therefrom, the first support bar is rotatable with respect to the other one of the first pair of suspension arms, thereby facilitating removal of the spare tire from the apparatus. In accordance with another aspect of the invention, the extension portion of one of the first pairs of suspension arms projects outwardly from beneath the vehicle to facilitate access to a portion of the first support bar which is detachably coupled to one of the first pair of suspension arms.

BRIEF DESCRIPTION OF THE DRAWINGS

Objects and advantages of the invention will be apparent from the Detailed Description and Claims when read in conjunction with the accompanying drawings wherein:

FIG. 4 is a side elevation view of the bottom portion of the spare tire storage apparatus, illustrating the removal of a spare tire from its stored position; and FIG. 5 is a top plan view of a portion of a pick-up truck, illustrating the spare tire storage apparatus.

DETAILED DESCRIPTION OF THE PREFERRED EMBODIMENT

In the description which follows, like parts are marked with corresponding reference numbers throughout the Specification and Drawings, respectively. The drawings are not necessarily to scale and in some instances proportions have been exaggerated in order to more clearly depict certain features of the invention.

Figure 1:
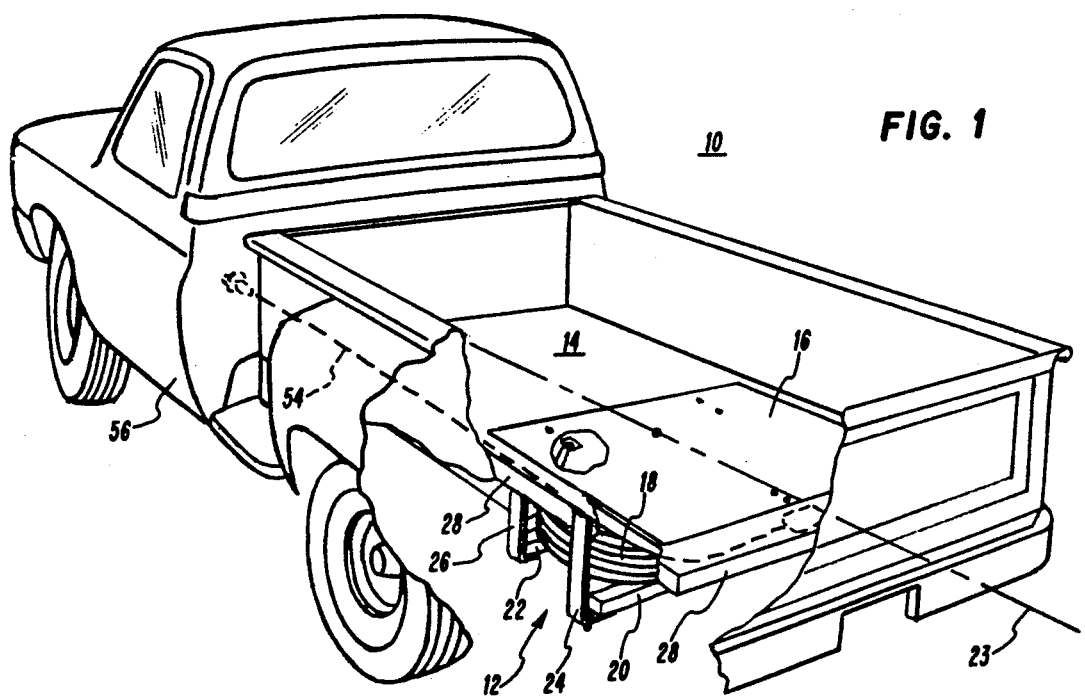
FIG. 1 is a perspective view of a pick-up truck, a portion of which is broken away to illustrate a spare tire storage apparatus in accordance with the present invention.

Referring to FIG. 1, a vehicle, such as a pick-up truck 10, is equipped with a spare tire storage apparatus, indicated generally at 12 beneath bed 14 of truck 10. A portion of bed 14 is cut along the perimeter of a predetermined rectangle to provide a substantially rectangular panel 16, which functions as a cover member, as will be described in greater detail hereinafter. A spare tire 18 is journally supported by first and second spaced-apart support bars 20 and 22 extending laterally with respect to a fore and aft axis 23 of truck 10. First support bar 20 is mounted at respective opposite ends thereof on respective lower ends of a first pair of suspension arms 24 (only one of which is shown in FIG. 1). Similarly, second support bar 22 is mounted at respective opposite ends thereof on respective lower ends of a second pair of suspension arms 26 (only one of which is shown in FIG. 1).

Portions of the existing truck frame project downwardly from beneath truck bed 14, as indicated generally at 28, for limiting the fore and aft and side-to-side movements of spare tire 18, thereby retaining spare tire 18 within a semi-enclosed housing defined by support bars 20 and 22, suspension arms 24 and 26 and panel 16, such that spare tire 18 is maintained substantially in registration with panel 16, as shown in FIG. 5.

Figure 2:
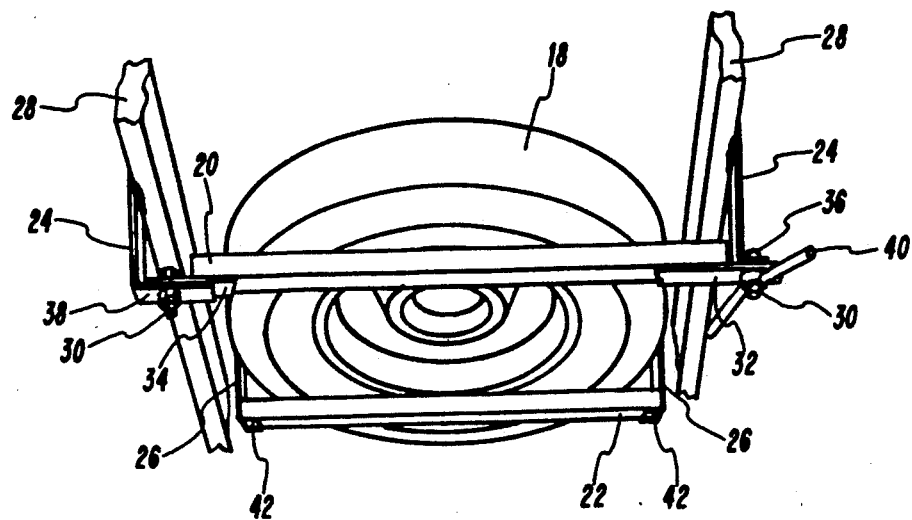
FIG. 2 is a perspective view of a bottom portion of the spare tire storage apparatus.

Referring to FIG. 2, first and second support bars 20 and 22 are in substantially parallel relationship and are spaced apart sufficiently to support spare tire 18 in a stable, horizontal position. First and second pairs of suspension arms 24 and 26 are attached at respective upper ends thereof to longitudinally extending frame members 28 beneath the truck bed. First and second pairs of suspension arms 24 and 26 extend downwardly from frame members 28 a distance which is sufficient to support the whole tire 18 below bed 14, but close enough to bed 14 so that at least portions of frame members 28 extend below the top of tire 18 on all sides. As such, longitudinal frame members 28 limit the side-to-side movement of spare tire 18, while laterally extending frame members 28 (see FIG. 1) limit the fore and aft movement of spare tire 18, as previously described.

First support bar 20 is preferably detachably coupled to first pair of suspension arms 24 by bolt attachment 30. First support bar 20 includes bottom extension portions 32 and 34, which are placed in abutting relationship with respective extension portions 36 and 38 of suspension arms 24. Extension portions 32 and 34 of first support bar 20 and extension portions 36 and 38 of suspension arms 24 have openings therein, which are positioned in alignment for receiving threaded bolts 30 therethrough. A threaded nut engages each threaded bolt for securing first support bar 20 to first pair of suspension arms 24. Similarly, first support bar 20 can be detached from first pair of suspension arms 24 by loosening the threaded nut and removing the bolt from the aligned openings.

It is only necessary to detach one end of first support bar 20 in order to remove spare tire 18. To facilitate the decoupling of first support bar 20, a wing nut 40 is disposed at one end of first support bar 20. Wing nut 40 has an elongated handle to facilitate loosening and tightening of nut 40, so that nut 40 can be loosened and tightened without a wrench or other tool. When wing nut 40 and the corresponding bolt 30 are removed, first support bar 20 is rotatable about an axis aligned with the particular attachment bolt 30 at the opposite end of first support bar 20, such that first support bar 20 is pivotally attached to the corresponding suspension arm 24 at the opposite end of first support bar 20. First support bar 20 can be swung either toward or away from second support bar 22 to allow spare tire 18 to topple downwardly and rearwardly from its stored position, as best seen in FIG. 4. Bolt 30 may be extended below wing nut 40 and a hole drilled in the shaft portion of bolt 30 for receiving a padlock or other locking mechanism to prevent or deter unauthorized access to the spare tire. Extension portions 36 and 38 of suspension arms 24 extend laterally with respect to fore and aft axis 23 to provide respective mounting surfaces for extension portions 32 and 34. As best seen in FIG. 2, extension portion 36 projects outwardly from the storage compartment and from adjacent side frame 28 to facilitate access to wing nut 40, whereby extension portion 32 of first support bar 20 can be selectively attached to and detached from extension portion 36.

As shown in FIG. 4, a back facing portion 18A of tire 18 will topple downward when the support thereof provided by first support bar 20 is removed. Front facing portion 18B of tire 18 can then be removed from second support bar 22 by simply sliding back facing portion 18A toward the back of pick-up truck 10. In order to replace spare tire 18 in a stored position the procedure is reversed, such that front facing portion 18B of the tire is positioned on second support bar 22 and back facing portion 18A is supported by lifting force exerted by a user until first support bar 20 is swung back into position and reattached to a corresponding suspension arm 24, whereupon tire 18 will be supported in the horizontal position shown in FIG. 2.

Second support bar 22 is preferably permanently attached by welding or the like to a second pair of suspension arms 26. Second pair of suspension arms 26 includes extension portions 42 for mounting second support bar 22 thereon at respective opposite ends thereof.

Figure 3:
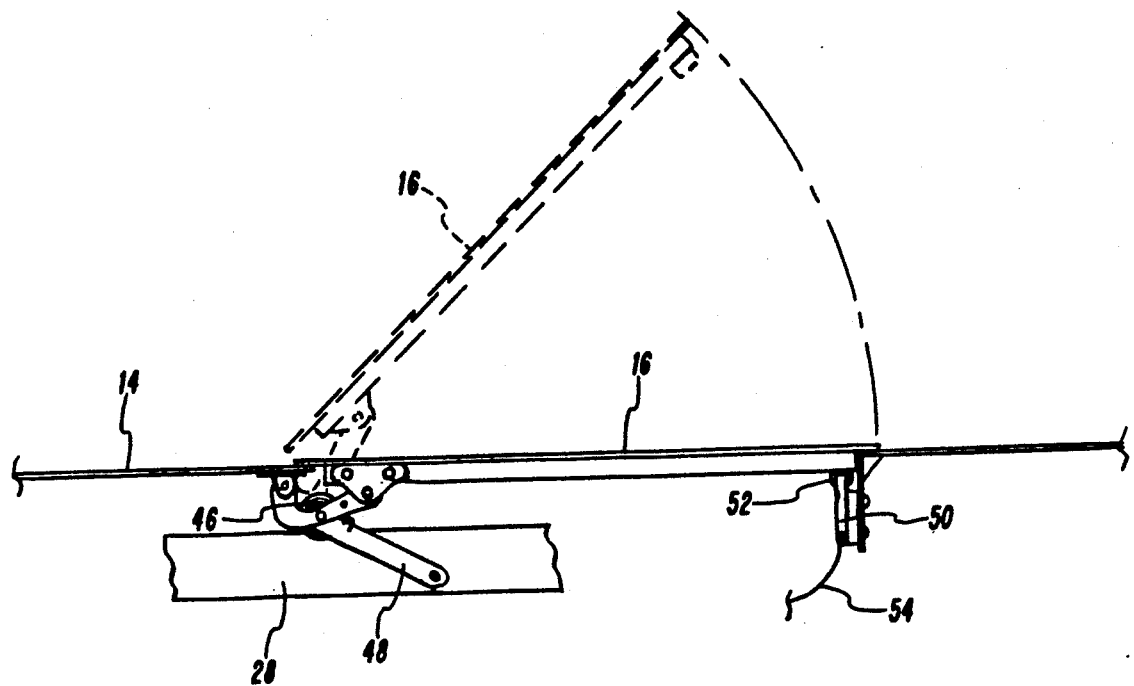
FIG. 3 is a side elevation view of a top portion of the spare tire storage apparatus.

Referring to FIG. 3, panel member 16 (see FIG. 1) is hingedly connected to a frame member 28 beneath truck bed 14 to provide a cover member 16 for the storage apparatus. A coiled compression spring 46 is attached to a hinge 48 at each side of cover member 16 (only one hinge 48 is illustrated in FIG. 3). Other hinges (not shown) may be positioned intermediate hinges 48 to stabilize cover member 16.

Compression spring 46 biases cover member 16 toward an open position, as indicated by the dashed lines in FIG. 3, such that access to a spare tire is available through an opening in truck bed 14. In order to close off the opening, cover member 44 is forced downwardly to a relatively horizontal position substantially coplanar with bed 14. A latch mechanism 50 engages a pin 52 on an undersurface of cover member 16 to hold down cover member 16 against the spring bias of compression spring 46. Latch mechanism 50 is of conventional design and may be of the type typically used to hold down the hood of an automobile.

A latch release mechanism, which preferably includes a cable release mechanism 54, is provided for disengaging latch mechanism 50 from pin 52, to allow compression spring 46 to rotate cover member 16 upwardly to an open position. When tension is exerted on cable 54, latch 50 releases pin 52 by spring action. Cable release mechanism 54 is preferably operable from passenger compartment 56 (see FIG. 1) by means of a handle or the like (not shown) installed in compartment 56.

In accordance with the present invention, access to a spare tire or the like is readily available from either above or below a truck bed or the like. Typically, it is more convenient to remove the spare tire from the storage area and replace the spare tire therein via the opening in the truck bed. However, when the truck bed is fully loaded, such that it would be difficult and/or inconvenient to open the cover member, the user can quickly and conveniently get access to the spare tire from beneath the vehicle by simply disconnecting one end of the first support bar and swinging the support bar out of the way to allow the spare tire to topple downwardly from its stored position. By maintaining the spare tire slightly below the truck bed, the frame members projecting downwardly from beneath the truck bed can effectively prevent fore and aft and side-to-side movement of the tire, so that the tire is maintained substantially in registration with the opening in the bed. No additional mechanism is needed to retain the tire in its proper position.

Various embodiments of the invention have now been described in detail. Since it is obvious that many changes in and additions to the above-described preferred embodiment can be made without departing from the nature, spirit and scope of the invention, the invention is not to be limited to said details, except as set forth in the appended claims.

What is claimed is:

1. Apparatus for supporting a spare tire beneath a vehicle, said apparatus comprising:

first and second spaced-apart support bars;

first and second pairs of suspension arms attached to a bottom part of said vehicle and depending therefrom, respective distal portions of said first and second pairs of suspension arms extending laterally, said first support bar extending between said first pair of suspension arms and being coupled to the respective extension portions of the first pair of suspension arms, said second support bar extending between said second pair of suspension arms and being coupled to the respective extension portions of said second pair of suspension arms; wherein said first support bar is detachably coupled to at least one of said first pair of suspension arms, such that when said first support bar is detached therefrom, said first support bar is rotatable with respect to the other one of said first pair of suspension arms, thereby facilitating removal of said spare tire from said apparatus.

2. Apparatus of claim 1 wherein the extension portion of said at least one of said first pair of suspension arms extends outwardly from beneath said vehicle to facilitate access to a portion of said first support bar which is detachably coupled to said at least one of said first pair of suspension arms.

3. Apparatus of claim 2 wherein said first support bar has a first opening adjacent to each end thereof and said first pair of suspension arms have respective second openings in the respective extension portions thereof, each of said first openings being positioned substantially in alignment with a corresponding second opening when said first support bar is detachably coupled to said first pair of suspension arms, said apparatus further including attachment means for penetrating through each pair of aligned openings to detachably secure said first support bar to said first pair of suspension arms.

4. A vehicle storage compartment, comprising:

support means disposed beneath the vehicle and attached thereto for supporting a spare tire, said support means cooperating with a bottom part of said vehicle to provide a semi-enclosed housing for said spare tire, said support means including:

first and second spaced-apart support bars;

first and second pairs of suspension arms attached to the bottom part of said vehicle and depending therefrom, respective distal portions of said first and second pairs of suspension arms extending laterally, said first support bar extending between said first pair of suspension arms and being coupled to the respective extension portions of the first pair of suspension arms, said second support bar extending between said second pair of suspension arms and being coupled to the respective extension portions of said second pair of suspension arms, said first support bar being detachably coupled to at least one of said first pair of suspension arms, such that when said first support bar is detached therefrom, said first support bar is rotatable with respect to the other one of said first pair of suspension arms, thereby facilitating removal of said spare tire from said apparatus;

an opening in the bottom part of the vehicle above the support means for allowing access to said spare tire from above the vehicle; and a cover member for closing off said opening, said cover member being movable to permit access to said spare tire through said opening.

5. The compartment of claim 4 wherein the extension portion of said at least one of said first pair of suspension arms extends outwardly from beneath said vehicle to facilitate access to a portion of said first support bar which is detachably coupled to said at least one of said first pair of suspension arms.

6. The compartment of claim 5 wherein said first support bar has a first opening adjacent to each end thereof and said first pair of suspension arms have respective second openings in the respective extension portions thereof, each of said first openings being positioned substantially in alignment with a corresponding second opening when said first support bar is detachably coupled to said first pair of suspension arms, said support means further including attachment means for penetrating through each pair of aligned openings to detachably secure said first support bar to said first pair of suspension arms.

7. In a pick-up truck having a passenger compartment and a truck bed aft of the passenger compartment, apparatus for storing a spare tire beneath the truck bed, said apparatus comprising:

support means disposed beneath the truck bed and attached thereto for supporting said spare tire, said support means cooperating with a bottom part of the truck bed to provide a semi-enclosed housing for said spare tire, said support means including:

first and second spaced-apart support bars; and first and second pairs of suspension arms attached to the bottom part of the truck bed and depending therefrom, respective distal portions of said first and second pairs of suspension arms extending laterally, said first support bar extending between said first pair of suspension arms and being coupled to the respective extension portions of the first pair of suspensions arms, said second support bar extending between said second pair of suspension arms and being coupled to the respective extension portions of said second pair of suspension arms, said first support bar being detachably coupled to at least one of said first pair of suspension arms, such that when said first support bar is detached therefrom, said first support bar is rotatable with respect to the other one of said first pair of suspension arms, thereby facilitating removal of said spare tire from said apparatus;

an opening in the bottom part of the truck bed above said support means for allowing access to said spare tire from above the truck bed; and a cover member for closing off said opening, said cover member being movable to permit access to said spare tire through said opening.

* * * * *